H. G. BARROWS.

Potato-Diggers.

No. 135,307.

Patented Jan. 28, 1873.

Witnesses:
Albert H. Norris.
Wm. J. Peyton.

Inventor:
H. G. Barrows,
by
James L. Norris,
Attorney.

UNITED STATES PATENT OFFICE.

HANSON G. BARROWS, OF BENTON, MAINE.

IMPROVEMENT IN POTATO-DIGGERS.

Specification forming part of Letters Patent No. 135,307, dated January 28, 1873.

*To all whom it may concern:*

Be it known that I, HANSON G. BARROWS, of Benton, in the county of Kennebec and State of Maine, have invented certain new and useful Improvements in Potato-Digger, of which the following is a specification:

This invention has for its object to furnish simple and effective means for digging potatoes; and it consists in the combination, with a standard and excavating shovel or shares, of a series of parallel fingers or tines projecting backward from the sides of the sole or base of the standard in an oblique horizontal direction for depositing the potatoes free from earth at the sides of the hill.

Figure 1:
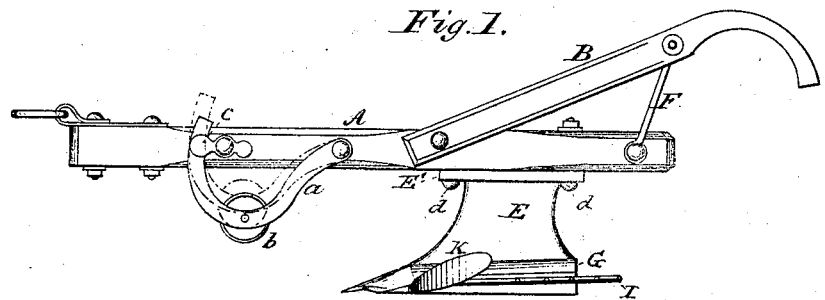
Figure 2:
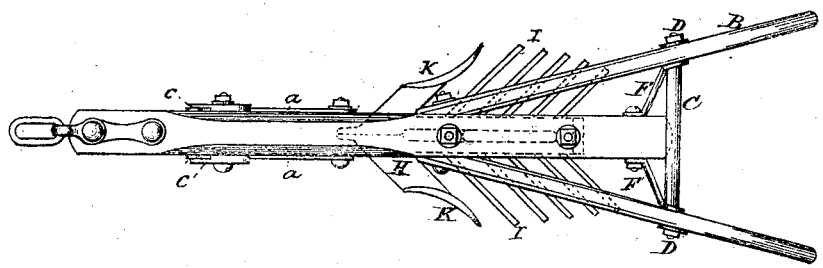
Figure 3:
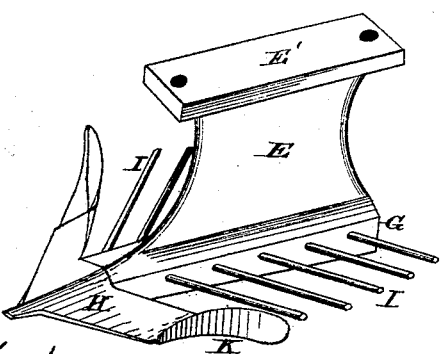
Figure 4:
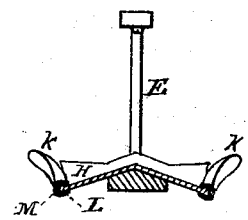

In the drawing, Figure 1 represents a side elevation of my invention. Fig. 2 represents a plan or top view of the same. Fig. 3 is a perspective view, representing the digging devices in detail. Fig. 4 illustrates, in detail, the method of attaching the detachable wings to the shovel.

The beam A, carrying the excavating-plow and separating devices, is provided with the usual handles B, which are firmly secured in place by means of a transverse metallic bar, C, the screw-threaded ends of which extend through the handles for the application of nuts D D. The inclined brace-rods F, provided with eyes at their ends for the passage of the bar C and a transverse screw-bolt extending through the beam, serve to sustain the handles at the proper distance above the beam. Near the front end of the beam are provided segmental or arc-shaped plates *a*, carrying a gage or caster wheel, *b*, which is designed for regulating the depth of penetration of the opening-plow into the earth. The vertical adjustment of said gage-wheel is effected by elevating the arc-shaped plates, the front upper ends of which are embraced between the beam and pivoted buttons or latches *c*. The standard E is provided with a plate, E', at its upper end for the passage of the screw-bolts *d d* which secure it to the beam, and its lower end is enlarged laterally to form a sole, G, for steadying the movement of the implement through the soil. A seat at the front end of the sole is designed for the reception of a double-winged shovel-plow, H, which is provided with a projecting point and front cutting-edges. A series of fingers or tines, I, project from both sides of the sole or base of the standard in an oblique horizontal manner and parallel to one another. To the side of the shovel or excavating scoop H are applied curved wings or mold-boards K, provided on their rear or reverse sides with a dovetail or tapering recess, L, for the reception of the correspondingly lateral edge M of the plow or shovel. This method of connection obviates the necessity of employing fastening-bolts, &c., while being simple and efficient for readily removing and applying the wings.

The operation of my invention is as follows: The forward movement of the implement along the row or hill causes the point and shovel to penetrate the earth beneath the potatoes, thus elevating the soil together with the potatoes, which, passing over the shares, fall upon the tines or fingers, the soil being broken and pulverized and passed through the spaces between the fingers, while the potatoes are deposited at the sides of the hill free from earth. The detachable wings applied to the shovel perform the operation of removing a portion of the sides of the hill for diminishing the work of the excavating-shovel proper. The series of horizontal tines, forming a riddle for the separation of the soil from the potatoes, will, by reason of their relative arrangement in an oblique outward direction, deposit the potatoes at the sides of the row and upon the surface of the ground, thus preventing the possibility of their being covered.

I claim as my invention—

The combination, with the standard E and shovel or excavating plow H, of a series of parallel fingers or tines, I, extending horizontally in an oblique direction from the sides of the standard, as and for the purpose specified.

In testimony that I claim the foregoing I have hereunto set my hand this 11th day of December, 1872.

HANSON G. BARROWS.

Witnesses:
 E. W. McFADDEN,
 SIMEON C. PAGE.